United States Patent
Klauke et al.

(10) Patent No.: US 9,453,426 B2
(45) Date of Patent: Sep. 27, 2016

(54) STATOR VANE ADJUSTING DEVICE OF A GAS TURBINE

(71) Applicant: Rolls-Royce Deutschland Ltd & Co KG, Blankenfelde-Mahlow (DE)

(72) Inventors: Thomas Klauke, Luebbenau/Spree (DE); Mats Mojem, Berlin (DE); Nishanth Rajaratnam, Lieusaint (FR)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 574 days.

(21) Appl. No.: 14/073,157

(22) Filed: Nov. 6, 2013

(65) Prior Publication Data
US 2014/0127003 A1 May 8, 2014

(30) Foreign Application Priority Data

Nov. 7, 2012 (DE) .......................... 10 2012 021 876

(51) Int. Cl.
*F01D 9/04* (2006.01)
*F01D 17/16* (2006.01)
*F02C 9/20* (2006.01)

(52) U.S. Cl.
CPC ............ *F01D 9/045* (2013.01); *F01D 17/162* (2013.01); *F02C 9/20* (2013.01); *F05D 2260/50* (2013.01)

(58) Field of Classification Search
CPC .. F01D 9/045; F01D 17/162; F05D 2260/50; F02C 9/20
See application file for complete search history.

(56) References Cited

U.S. PATENT DOCUMENTS

| 3,574,479 | A | * | 4/1971 | Barnard | F01D 17/162 |
| | | | | | 415/147 |
| 3,801,216 | A | | 4/1974 | Holzhauer et al. | |
| 3,861,822 | A | * | 1/1975 | Wanger | F04D 29/563 |
| | | | | | 415/147 |
| 4,720,237 | A | * | 1/1988 | Weiner | F04D 29/563 |
| | | | | | 415/150 |
| 5,692,879 | A | | 12/1997 | Charbonnel | |
| 2005/0129510 | A1 | | 6/2005 | Raine et al. | |
| 2006/0263206 | A1 | | 11/2006 | Bouru | |

FOREIGN PATENT DOCUMENTS

DE 2041109 2/1972

OTHER PUBLICATIONS

German Search Report dated Jul. 18, 2013 from counterpart app No. 10 2012 021 876.1.

* cited by examiner

*Primary Examiner* — Igor Kershteyn
(74) *Attorney, Agent, or Firm* — Timothy J. Klima; Shuttleworth & Ingersoll, PLC

(57) ABSTRACT

A stator vane adjusting device of a gas turbine has a plurality of stator vanes each rotatable about a radial axis 44 and arranged in at least two radial planes, as well as at least one stator vane adjusting ring connected to the respective stator vanes and rotatable in the circumferential direction by at least one actuating device. The actuating device includes a crankshaft element rotatable about a stationary pivot axis by an actuator. A first lever is articulated by a joint to the stator vane adjusting ring, with its free end being connected by a joint to a center area of a second lever, the second lever being mounted at its one end on a stationary pivot point and at its other end being linked by a joint to a third lever, which is mounted by a joint at its free end on the crankshaft element.

8 Claims, 7 Drawing Sheets

STATOR VANE ADJUSTING DEVICE OF A GAS TURBINE

Figure 1:
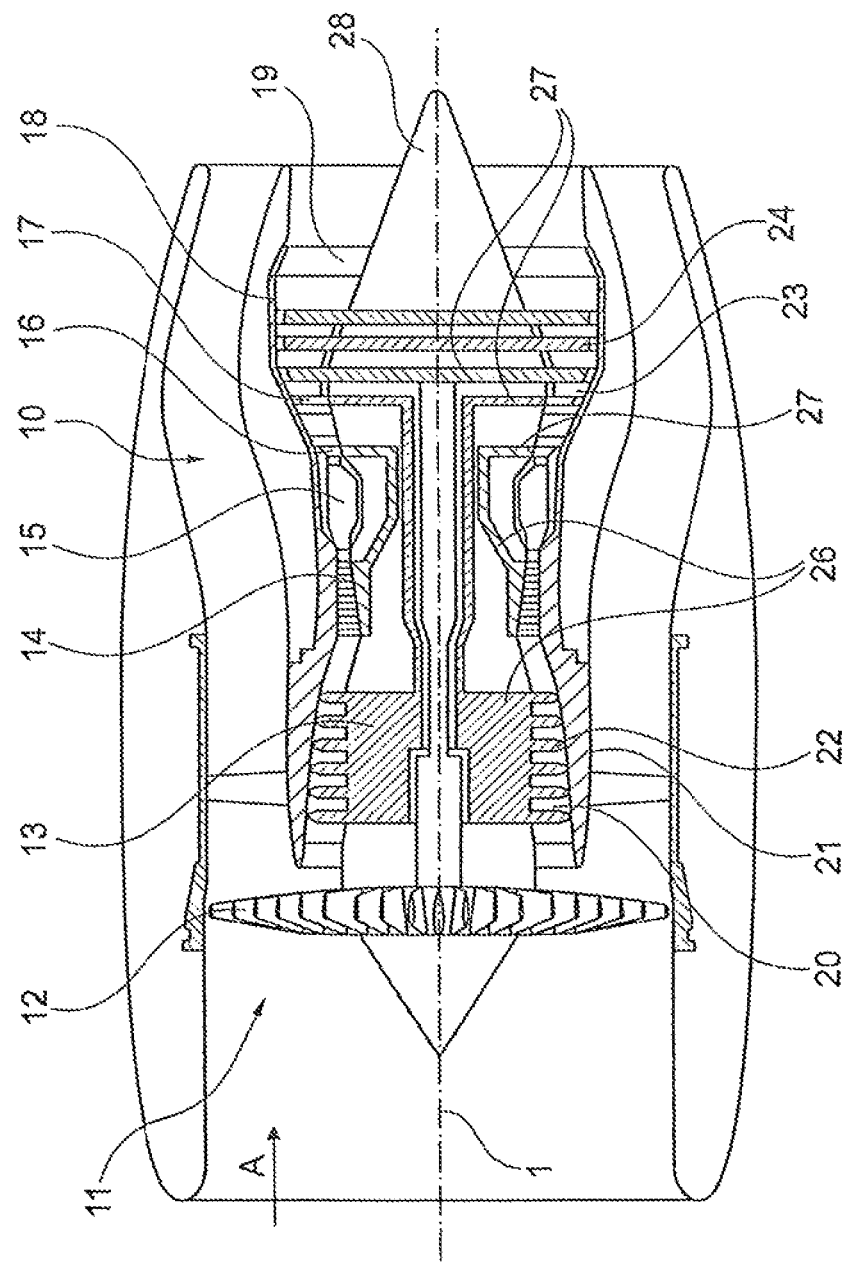

This application claims priority to German Patent Application DE102012021876.1 filed Nov. 7, 2012, the entirety of which is incorporated by reference herein.

In detail, the invention relates to a stator vane adjusting device for a compressor or a turbine having a plurality of stator vanes each rotatable about a radial axis and arranged in at least two radial planes. The stator vanes thus form in each case a cyclic-symmetrical or disk-shaped arrangement, where rotor blades are arranged between the at least two stator vane arrangements and/or upstream and downstream in the flow direction, as is known from the state of the art.

For adjustment of the stator vanes of each cyclic-symmetrical or disk-shaped arrangement of stator vanes, a stator vane adjusting ring is provided which is rotatable in the circumferential direction. The stator vane adjusting ring is connected to the respective stator vane using a lever mechanism, such that when the stator vane adjusting ring is rotated the stator vanes are swivelled about their radial axes. The stator vane adjusting ring is connected to a suitable actuating device.

Arrangements of this type are already known from US 2005/0129510 A1, U.S. Pat. No. 5,692,879 or US 2006/0263206 A1, for example.

It is thus possible by means of the actuating device to adjust the pitch angle of the respective stator vane to the operating conditions of the compressor or turbine. The devices known from the state of the art can have the drawback that an optimum adjustment or setting of the stator vanes is not possible, due to the approximately linear adjustment or to the adjustment with an approximately fixed transmission ratio of the stator vane adjusting ring and hence of the stator vanes. It is in particular only possible to set the vanes optimally over a partial operating range, whereas under other operating conditions of the gas turbine the vanes cannot be set at an optimum angle. This leads to increased fuel consumption and harbours the risk of flow separations at the vane profiles. Furthermore, it is necessary to provide bleed valves in a compressor, increasing the overall manufacturing expense of the gas turbine. There is also a higher overall weight.

It was attempted in the state of the art to find a design solution for these effects in particular by making the stator vane adjusting rings and their mounting more complex or by increasing the number of active actuating mechanisms. This however results in additional costs, additional weight and a greater space requirement.

The object underlying the present invention is to provide a stator vane adjusting device for a compressor or a turbine of a gas turbine of the type specified at the beginning which, while being simply designed and easily and cost-effectively producible, avoids the disadvantages of the state of the art and enables precise adjustment of the stator vanes.

It is thus provided in accordance with the invention that the actuating device includes a crankshaft element which can be swivelled about a stationary pivot axis by means of an actuator. The crankshaft element preferably includes a first and a second cam element, as is the case in conventional crankshafts. The crankshaft element is preferably arranged with its pivot axis parallel to the engine axis and hence perpendicular to the pivot axis of the vanes.

The crankshaft element is, in accordance with the invention, actuated by means of an actuator which can be designed as a hydraulic piston/cylinder unit, but it is also possible to design it as an electric servo-drive.

The stator vane adjusting device in accordance with the invention includes three levers, i.e. a first lever, a second lever and a third lever, in order to provide a transmission with a distinctly non-constant transmission ratio. The first lever is articulated by a joint to the stator vane adjusting ring, with its other free end being connected by a joint to a center area of the second lever. The second lever is mounted at its one end on a stationary pivot point and at its other end is linked by a joint to the third lever. This third lever is in turn mounted by a joint at its other free end on the crankshaft element. By pivoting the crankshaft element, the first and the third lever are moved by the intermediate action of the second lever. Suitable dimensioning thus results in a movement (rotation) of the stator vane adjusting ring in the circumferential direction with a non-constant transmission ratio. This results in a linear and uniform movement of the actuator being converted into a non-linear adjustment of the stator vane adjusting ring and hence also into a non-linear setting of the vanes. This makes it possible to obtain an optimum pitch angle of the vanes for every speed of the gas turbine.

The stationary pivot points can be selected in a suitable manner in consideration of the required non-constant transmission ratio of the transmission formed by the three levers and adapted to the respective design conditions.

The embodiment in accordance with the invention results in an optimum pitch angle of the stator vanes for all operating conditions of the gas turbine. This leads to improved combustion plus improved flow conditions and better operability of the gas turbine. Furthermore, lower costs are incurred due to the smaller number of components needed and to the simpler design of the components. It may be possible to dispense with the bleed valves known from the state of the art.

As already mentioned, it is possible in particular to arrange the stationary pivot point, about which the second lever rotates, in a design-optimized manner, for example radially inside or radially outside the crankshaft element (relative to the machine axis).

In a particularly favourable embodiment, it is provided that the actuator is connected to the crankshaft element via an intermediate lever. This permits provision of the actuator at a favourable installation location and ensures an optimized transmission of force from the actuator to the cam element.

In accordance with the invention, it is furthermore possible with the device in accordance with the invention to adjust several stator vane rings using a common crankshaft element and an actuator.

Figure 2:
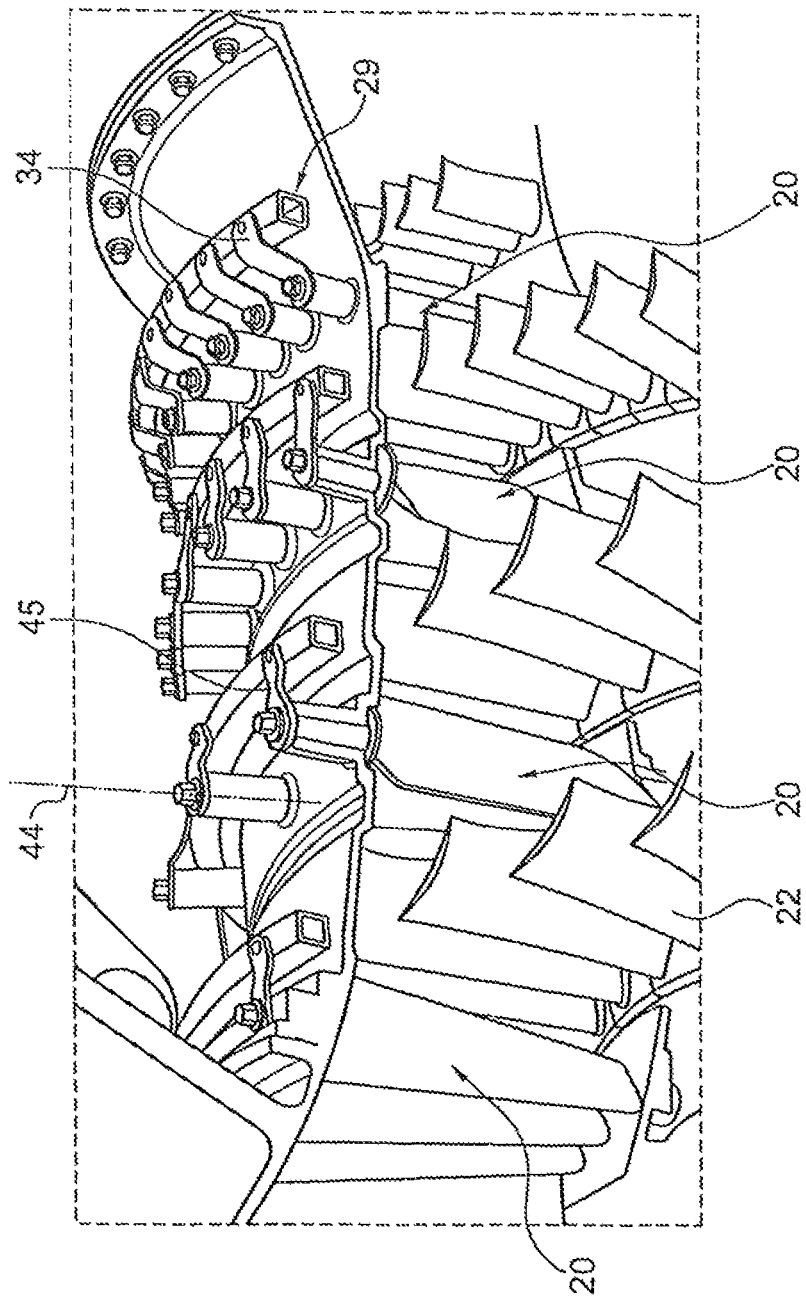
Figure 3:
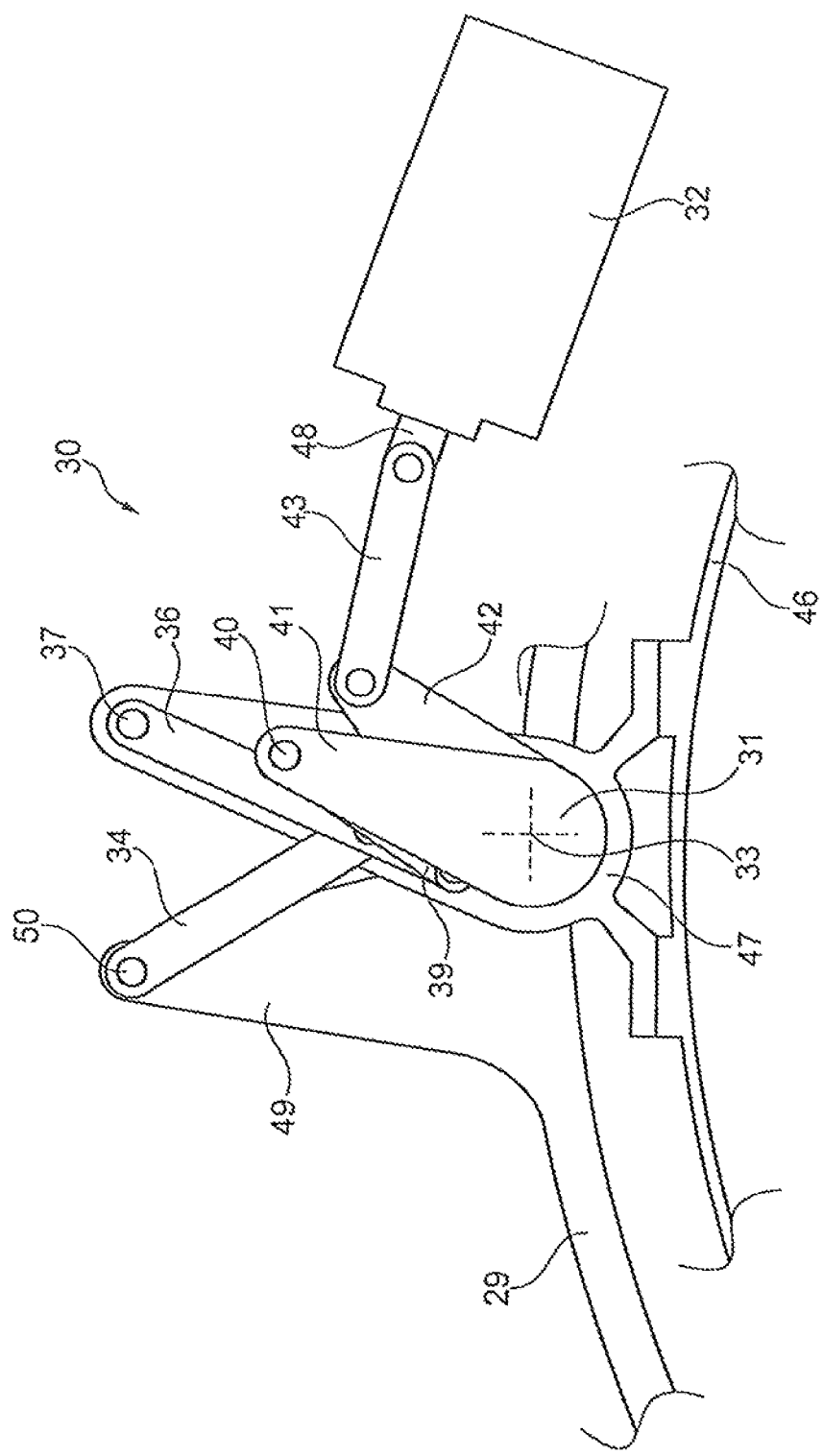
Figure 4:
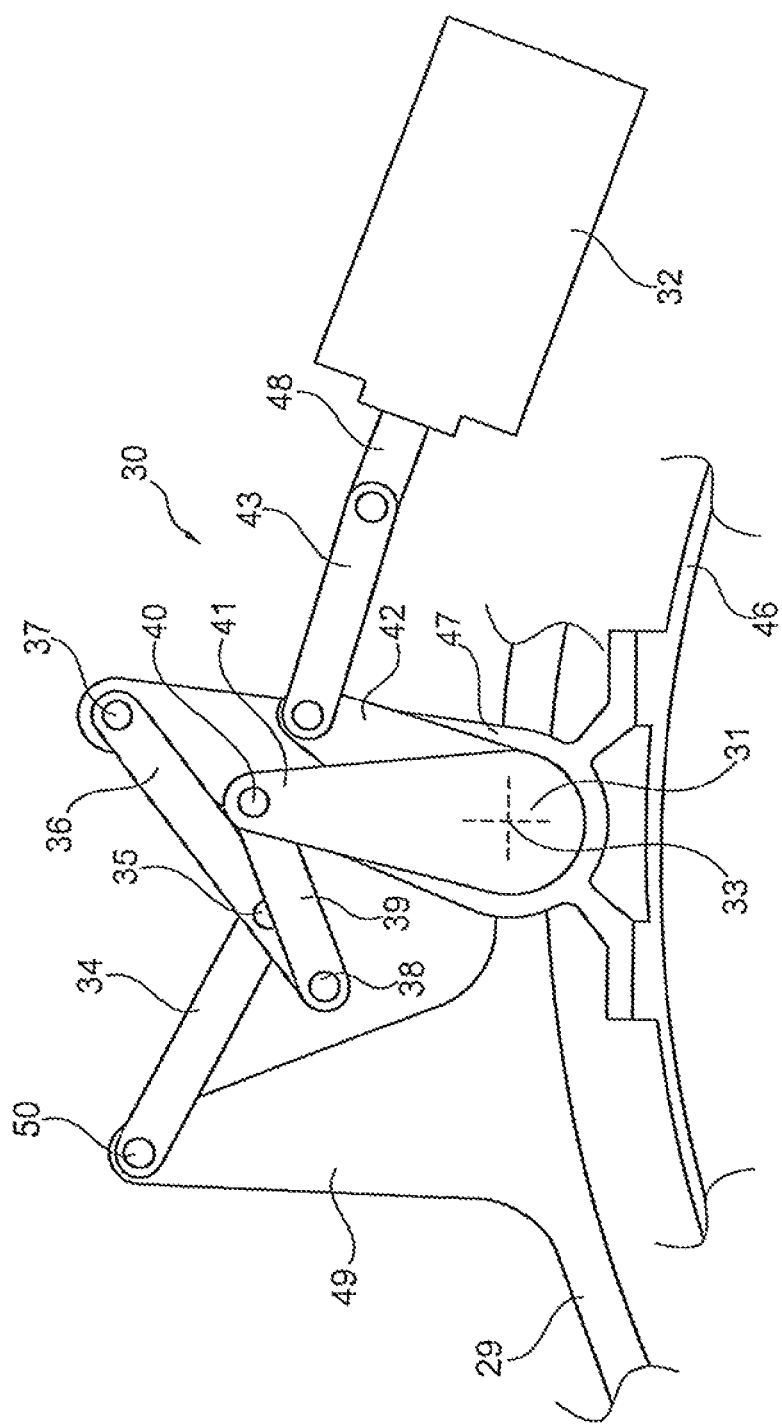
Figure 5:
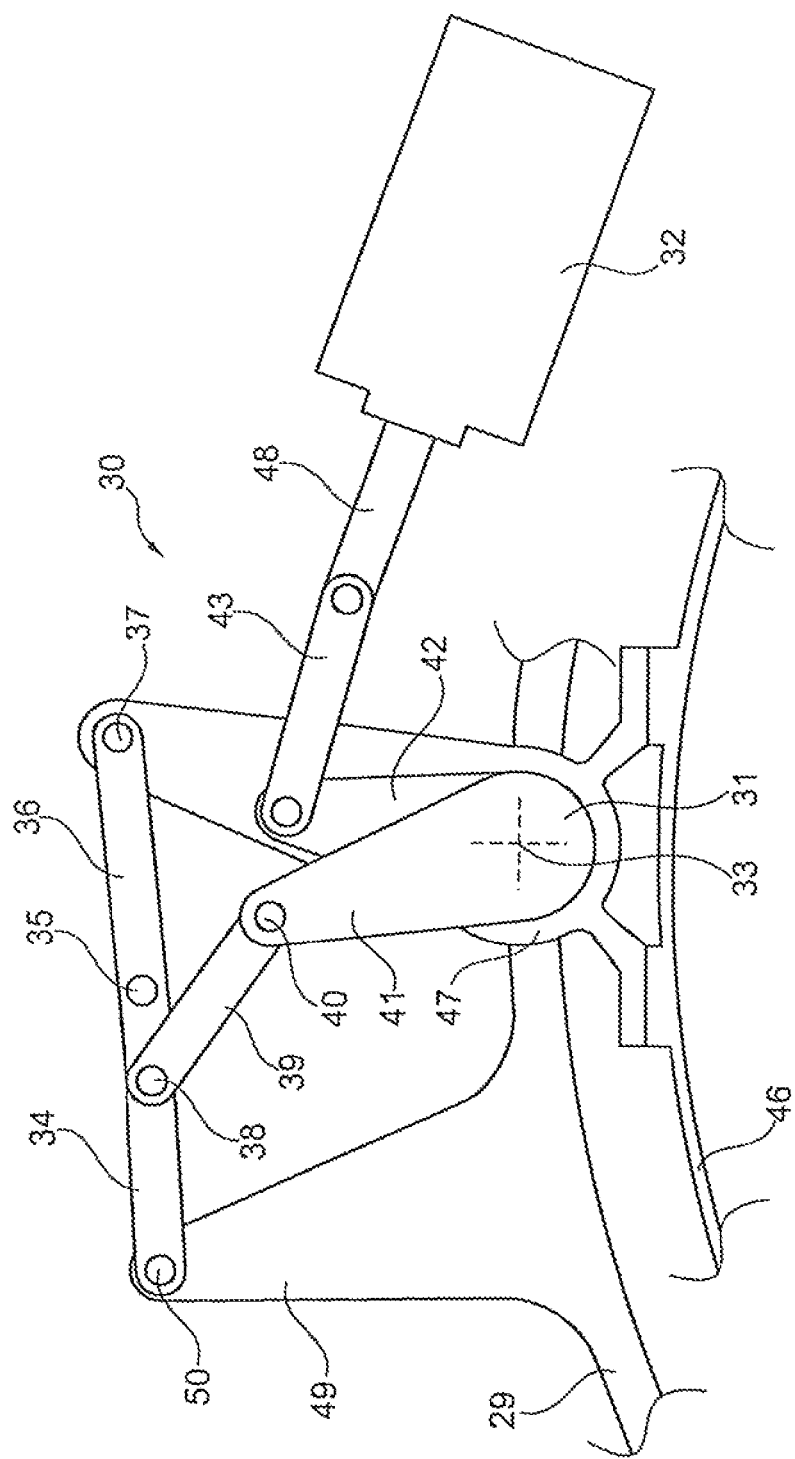
Figure 6:
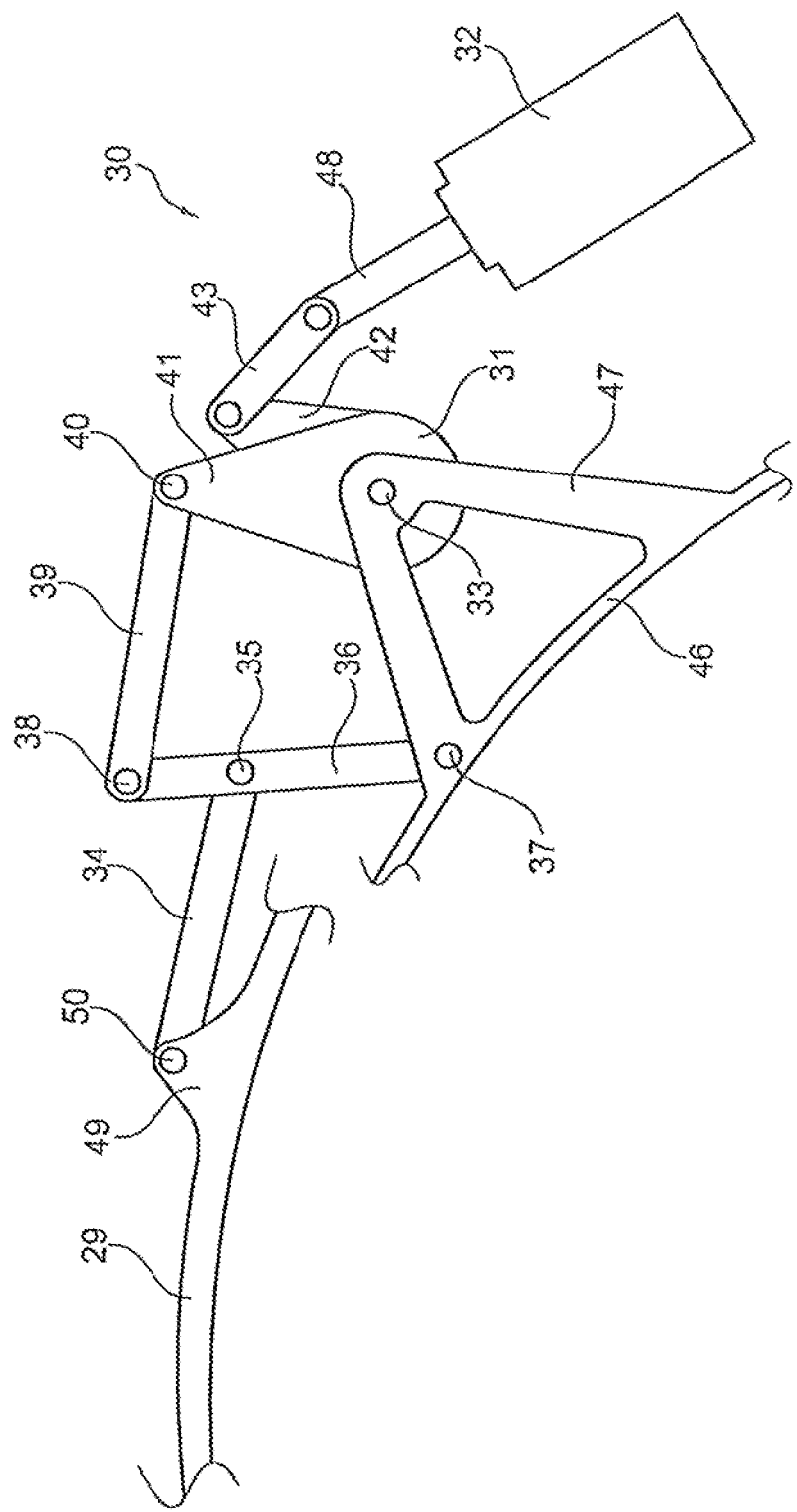
Figure 7:
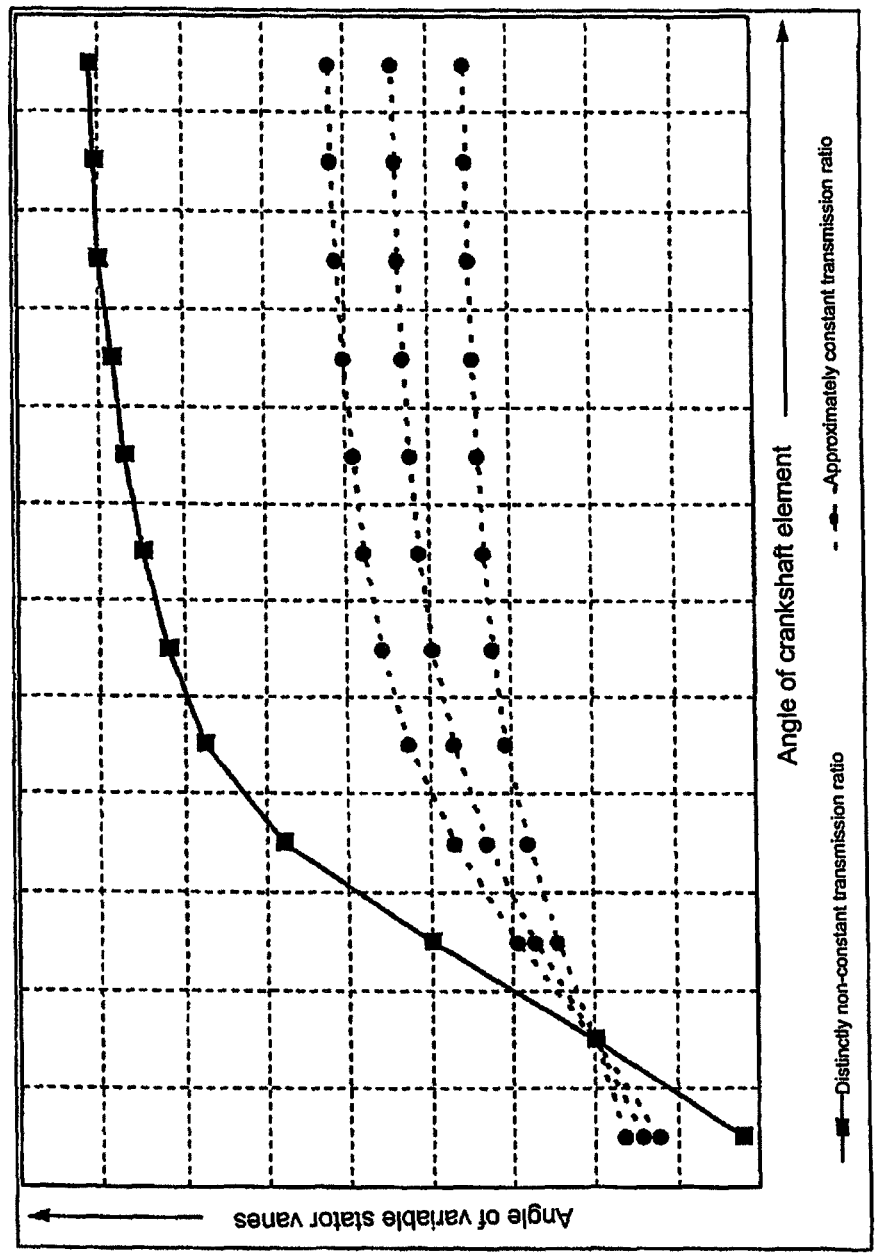

The present invention is described in the following in light of the accompanying drawing, showing exemplary embodiments. In the drawing, FIG. 1 shows a schematic representation of a gas-turbine engine in accordance with the present invention, FIG. 2 shows a perspective partial view of a compressor with adjustable stator vanes and stator vane adjusting rings, FIGS. 3 to 5 show different operating states of a first exemplary embodiment of the invention in simplified representation, FIG. 6 shows a schematic view, similarly to the FIGS. 3 to 5, of a further exemplary embodiment of the invention, and FIG. 7 shows a graphic representation which makes clear the non-constant transmission ratio of the adjustment in accordance with the invention.

The gas-turbine engine 10 in accordance with FIG. 1 is an example of a turbomachine where the invention can be used.

The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes, generally referred to as stator vanes 20 and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

The present invention is described in the following on the basis of a compressor, it is however also applicable to stator vanes of a turbine.

FIG. 2 shows a perspective partial view of a compressor having several rows of adjustable stator vanes 20, between which compressor rotor blades 22 are arranged. The individual stator vanes 20 are in each case rotatable about a radial axis 44. They are connected to a lever 45 which at its opposite end area is rotatably connected to a stator vane adjusting ring 29. Rotating the stator vane adjusting ring 29 in the circumferential direction results in swivelling of the individual levers 45. The effect of this is a rotation of the stator vanes 20 about the respective axis 44.

The FIGS. 3 to 5 show a first exemplary embodiment of the invention in schematic side view. A crankshaft element 31 rotatable about a stationary pivot axis 33 is mounted by means of a bearing pedestal 47. This element includes a first cam element 41 and a second cam element 42.

The second cam element is connected via an intermediate lever 43 to an actuator 32 including an actuating element 48 which is longitudinally moveable, as can be seen from the comparison of FIGS. 3 to 5. It is understood that the intermediate lever 43 is connected to the actuating element 48 and to the second cam element 42 by a joint.

Furthermore, FIGS. 3 to 5 show the stator vane adjusting ring 29 which is moveable in the circumferential direction in order to adjust the stator vanes 20, as explained in connection with FIG. 2. A bearing extension 49 is fastened to the stator vane adjusting ring 29 and is connected to a first lever 34 via a swivel joint 50. The opposite end of the first lever 34 is linked to the center part of a second lever 36 by means of a joint 35. The second lever 36 is mounted at its one end on the casing 46 by means of a stationary pivot point 37, while the other end of the second lever 36 is linked to a third lever 39 by means of a joint 38. The third lever 39 is in turn fastened at its other end to the first cam element 41 by means of a joint 40.

A movement of the actuating element 48 (cf. FIGS. 3 to 5) therefore results in the crankshaft element 31 rotating about the stationary pivot axis 33. This in turns results in a swivel of the first cam element 41. The latter swivels the second lever 36 by means of the third lever 39, by which the first lever 34 is swivelled and the stator vane adjusting ring 29 is moved.

FIG. 6 shows a modified exemplary embodiment differing from the exemplary embodiment in FIGS. 3 to 5 with regard to the position of the stationary pivot point 37. The latter is, according to FIG. 6, arranged close to the casing 46, while the exemplary embodiment of FIGS. 3 to 5 provides the pivot point 37 in a radially outer area of the bearing pedestal 47.

Identical parts in the exemplary embodiments of FIGS. 3 to 6 are otherwise given the same reference numerals.

FIG. 7 shows a simplified graphic representation which makes clear the distinctly non-constant transmission ratio in accordance with the invention in comparison with the approximately constant transmission ratio according to the state of the art. The angle of the crankshaft element is illustrated here as a function of the vane angle.

LIST OF REFERENCE NUMERALS

1 Engine axis
10 Gas-turbine engine
11 Air inlet
12 Fan rotating inside the casing
13 Intermediate-pressure compressor
14 High-pressure compressor
15 Combustion chamber
16 High-pressure turbine
17 Intermediate-pressure turbine
18 Low-pressure turbine
19 Exhaust nozzle
20 Compressor stator vanes
21 Engine casing
22 Compressor rotor blades
23 Turbine stator vanes
24 Turbine blades
26 Compressor drum or disk
27 Turbine rotor hub
28 Exhaust cone
29 Stator vane adjusting ring
30 Actuating device
31 Crankshaft element
32 Actuator
33 Stationary pivot axis
34 First lever
35 Joint
36 Second lever
37 Stationary pivot point
38 Joint
39 Third lever
40 Joint
41 First cam element
42 Second cam element
43 Intermediate lever
44 Axis
45 Lever
46 Casing
47 Bearing pedestal
48 Actuating element
49 Bearing extension
50 Joint

The invention claimed is:

1. A stator vane adjusting device of a gas turbine having:
   a plurality of stator vanes each rotatable about a radial axis and arranged in at least two radial planes,
   at least one stator vane adjusting ring connected to the respective stator vanes and rotatable in a circumferential direction by at least one actuating device, with the at least one actuating device including a crankshaft element rotatable about a stationary pivot axis by an actuator,
   a first lever, a second lever and a third lever, the first lever being articulated by a joint to the at least one stator vane adjusting ring, a free end of the first lever being connected by a joint to a center area of the second lever, with the second lever being mounted at one end thereof on a stationary pivot point and at another end thereof being linked by a joint to the third lever, which is mounted by a joint at a free end thereof on the crankshaft element.

2. The device in accordance with claim 1, wherein the stationary pivot point of the second lever is arranged radially inside the crankshaft element relative to an engine axis of the gas turbine.

3. The device in accordance with claim 1, wherein the stationary pivot point of the second lever is arranged radially outside the crankshaft element relative to an engine axis of the gas turbine.

4. The device in accordance with claim 1, wherein the crankshaft element includes at least a first and a second cam element, with the third lever being articulated to the first cam element and the actuator being coupled to the second cam element.

5. The device in accordance with claim 1, and further comprising an intermediate lever, with the actuator being connected to the crankshaft element via the intermediate lever.

6. The device in accordance with claim 1, wherein the at least one stator vane adjusting ring includes a plurality of stator vane adjusting rings which are each coupled to the crankshaft element by a first, second and third lever.

7. The device in accordance with claim 1, wherein the device converts a linear movement of the actuator into a non-linear rotation of the at least one stator vane adjusting ring.

8. The device in accordance with claim 1, wherein the lengths of the first second and third lever are selected to provide a transmission with a distinctly non-constant transmission ratio.

* * * * *